United States Patent [19]

Öhman

[11] Patent Number: 4,797,557
[45] Date of Patent: Jan. 10, 1989

[54] POSITION SENSING SYSTEM FOR A MOVING OBJECT WHEREIN A LENS FOCUSES LIGHT ONTO A RADIATION SENSITIVE MATRIX

[75] Inventor: Carl G. Öhman, Atvidaberg, Sweden
[73] Assignee: Aktiebolaget Electrolux, Sweden
[21] Appl. No.: 49,565
[22] Filed: May 14, 1987
[30] Foreign Application Priority Data
  May 23, 1986 [SE] Sweden .................. 8602369
[51] Int. Cl.[4] .............................................. G01V 9/04
[52] U.S. Cl. ........................................ 250/561; 901/47
[58] Field of Search ................. 356/141, 152; 250/561, 250/566, 557; 901/47

[56] References Cited

U.S. PATENT DOCUMENTS

| | | | |
|---|---|---|---|
| 4,355,895 | 10/1982 | Cairns et al. | 356/141 |
| 4,477,184 | 10/1984 | Endo | 356/141 |
| 4,600,305 | 7/1986 | Priddy | 356/152 |
| 4,647,784 | 3/1987 | Stephens | 250/561 |
| 4,648,048 | 3/1987 | Dorn et al. | 250/561 |
| 4,710,028 | 12/1987 | Grenier et al. | 356/152 |

Primary Examiner—David C. Nelms
Assistant Examiner—William L. Oen
Attorney, Agent, or Firm—Alfred E. Miller

[57] ABSTRACT

In an electrooptic position sensing system for an object (11) moving in a plane at least one light source (10) is fixedly disposed such that the radiation field of the light source covers the area within which the object (11) is intended to move. The object, for instance being a mobile robot, is provided with a matrix (18) of light-sensitive elements intended to receive radiation from the light source (10). A lens arrangement (12) focuses the incident radiation to a light spot on the matrix (18) which then emits corresponding electric signals. Means (20,21) are arranged to sense the matrix (18) to determine the position of the light spot from the element which most unambiguously reacts on the incident radiation. Further, means (24) are provided to calculate the coordinates of the position of the moving object in the plane of movement from the position of the most heavily reacting elements.

4 Claims, 5 Drawing Sheets

POSITION SENSING SYSTEM FOR A MOVING OBJECT WHEREIN A LENS FOCUSES LIGHT ONTO A RADIATION SENSITIVE MATRIX

The present invention relates to an electrooptic position sensing system for a moving object, preferably a mobile robot, of the kind having a light source, a light receiver on the object for receiving the light through a lens arrangement, and a calculating means for calculating the position of the object relative to the light source.

In order for a mobile robot to be able to navigate on its own it is very important for the robot always to know its own position with relatively great accuracy. Therefore, a map of the area within which the robot is to be moved is stored in a data memory in the robot.

For example, such a map can be created by means of a rotating ultrasonic radar apparatus. By reflection of the radar beams against room walls and fixed objects the borders of the area as well as fixed obstacles can be inserted in the map.

In addition to the knowledge of the nature of the area as given by the map described the robot must also know its own instantaneous position in the room. Such information can be received from the radar apparatus mentioned. However, this system has its limitations and, therefore, it is of value for the system to receive complimentary information from a parallel system operating in a different way. One way is to use suitable sensors to register the distance the robot has been moved from a given reference point in the room as well as the direction of movement. The disadvantage with such a system is the tendency of an accumulating fault to appear which seriously reduces the accuracy of the position determined for the robot.

The object of the invention is to remedy the drawback indicated and to provide a position sensing system which alone or together with a distance measuring system can compliment the radar system mentioned. The object is achieved in a system having the features indicated in the claims.

The invention will now be described more in detail in connection with an embodiment with reference to the enclosed drawings in which:

FIG. 1 schematically shows an electrooptic positioning system having a fixedly mounted light emitter and a light receiver mounted on a mobile robot.

Figure 7:
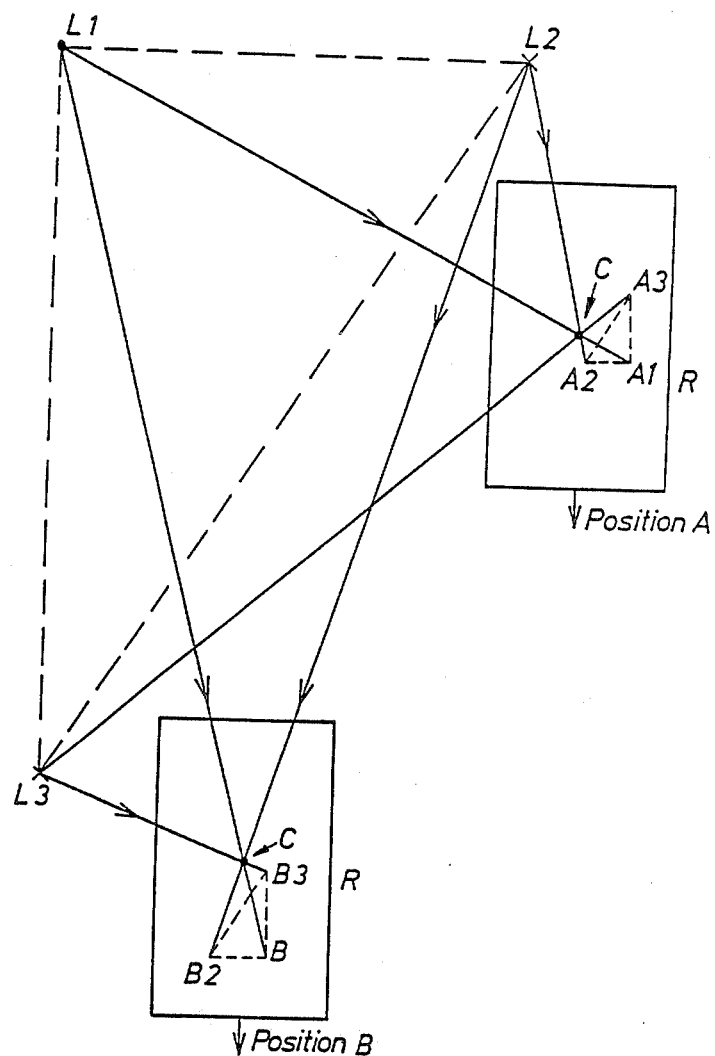

FIG. 7, finally, shows an embodiment having three light sources.

Figure 1:
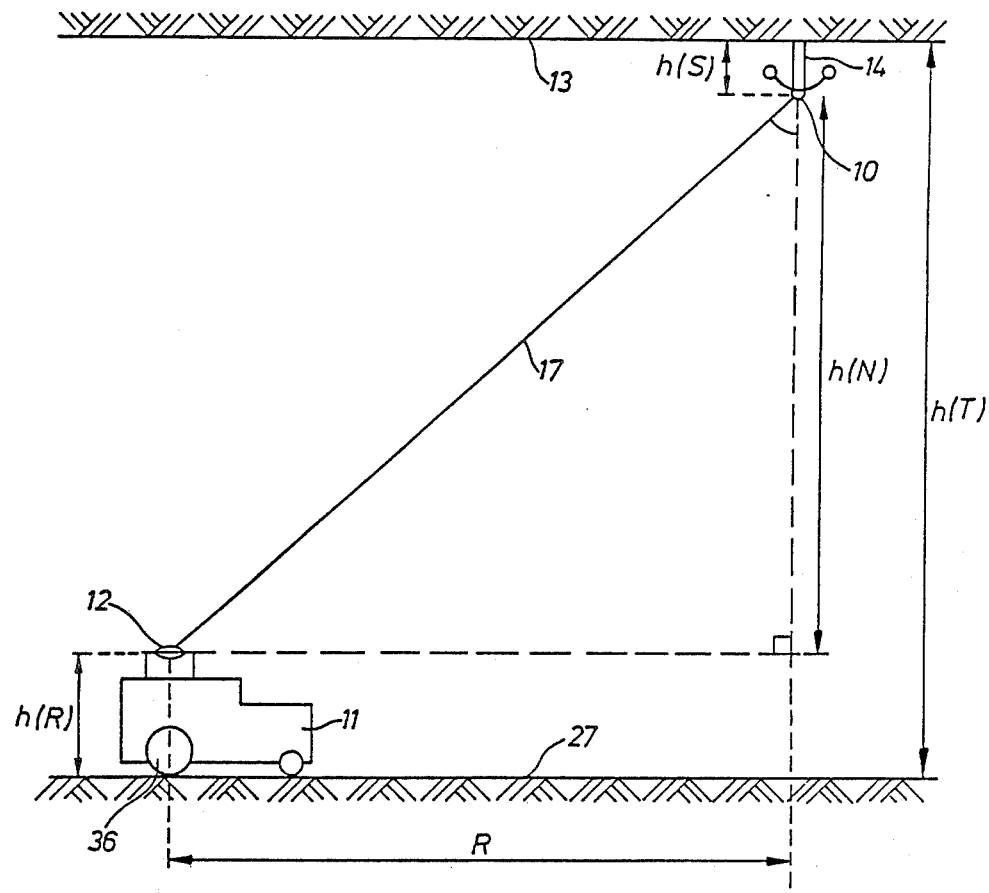

The position sensing system of FIG. 1 comprises a fixedly mounted light emitter 10 and a light receiver 12 mounted on a mobile robot 11. The light emitter 10 is a light emitting diode of the IR-type mounted in the ceiling 13 of the room in which the robot is moving or at some distance from the said ceiling. In the example the light emitting diode is mounted in a lamp fitting 14 fixedly mounted in the ceiling. The light emitting diode is mounted such that its radiation field is directly downwardly and the radiation angle is chosen such that the radiation field covers the area within which the robot is moving. By the use of IR-light the advantage is achieved that interfering visible light can be masked in the reciever by means of a simple IR-filter 15, FIG. 2.

Figure 3:
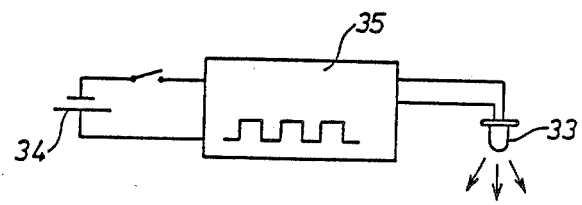
FIG. 3 is a block diagram of a light emitter.

The light receiver 12 is mounted on the upper side of the robot and comprises a convex lens 16 focusing the light from the light source, as represented by a beam 17, onto a plate 18, FIG. 3, on which is arranged a great number of light-sensitive elements. A suitable plate type, referred to as a CCD-array (Charged Coupled Device), comprises a matrix of 64×64 elements or as a total 4096 elements. The principle of function of such a CCD-plate is that all elements, having capacitive properties, are charged and then discharged upon being illuminated. By measuring how far the discharging process has proceeded for each element it will be possible to determine the quantity of radiation received during a predetermined time. The position of the light beam focused on the plate, which has the shape of a small round spot, can be determined from the element having received the highest amount of radiation.

Figure 4:
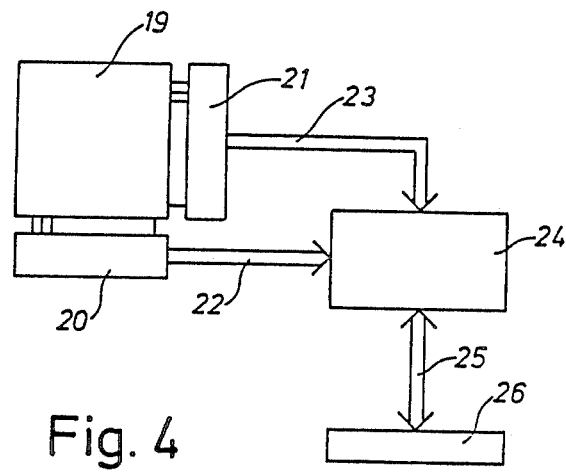
FIG. 4 is a block diagram of electronic equipment being part of the light receiver.

In FIG. 4 the CCD-plate is shown as a block 19 to which are connected x-decoding circuits 20 and y-decoding circuits 21. By these circuits information is received as to which of the light-sensitive elements has been most heavily activated by the incident IR-radiation and via lines 22, 23 this information is transferred to a microcomputer 24 by which the x-coordinates and y-coordinates for the actual position of the robot are determined. Via a line 25 the microcomputer is connected to a master microcomputer 26 to which are connected also other position sensing systems working in parallel, not shown.

Figure 5:
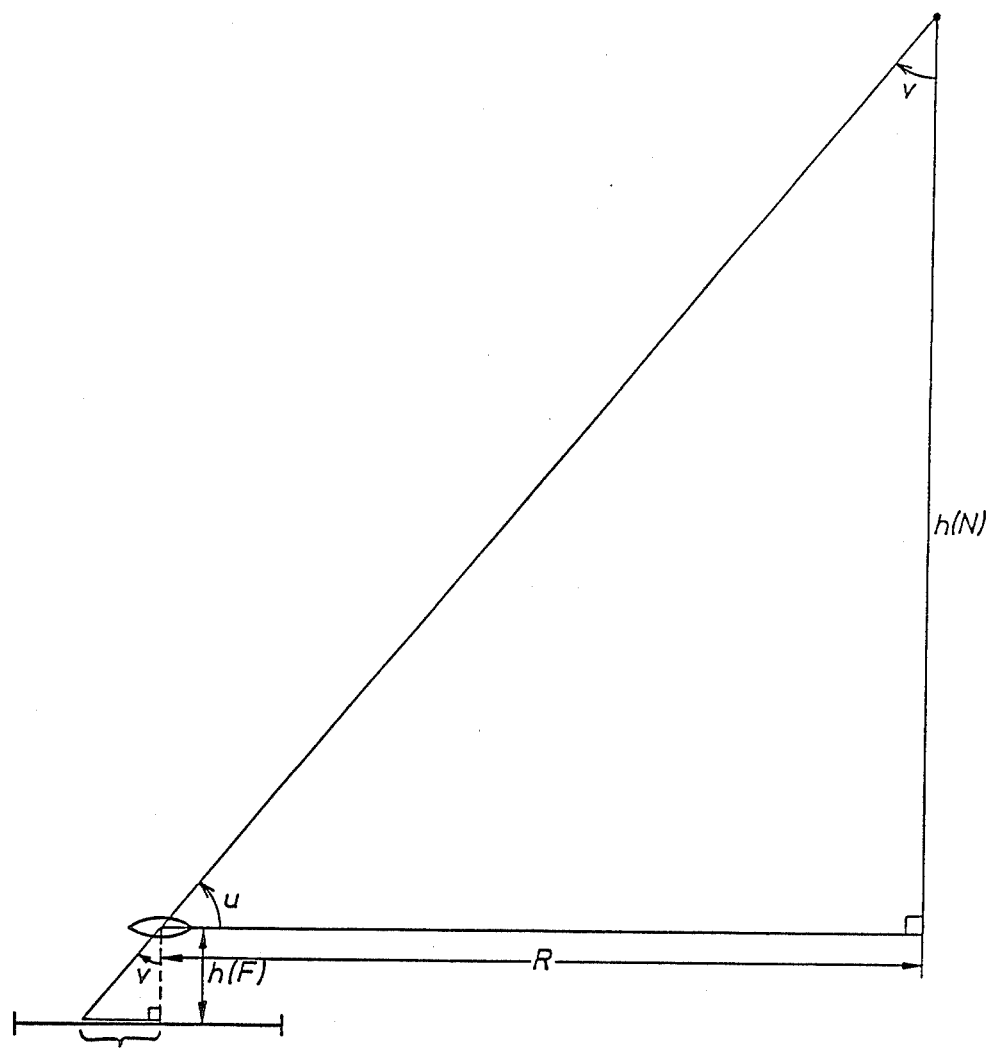
FIG. 5 is a diagram showing the geometric relationships used for the position calculation.

With reference to FIGS. 1 and 5 a short description will now be given of the geometric relationships relating to the position sensing system shown. The distance between the ceiling 13 of the room and the floor, referred to by 27, has been designated h(T). In Sweden a typical value of this distance is 2.40 meters. The light emitter 10 is situated at a distance from the ceiling referred to by h(S) and the height above the floor of the receiver is designated h(R). With the definitions thus given and with reference to the figure the following relationship can be set up:

$$h(T) = h(R) + h(N) + h(S) \tag{1}$$

Figure 2:
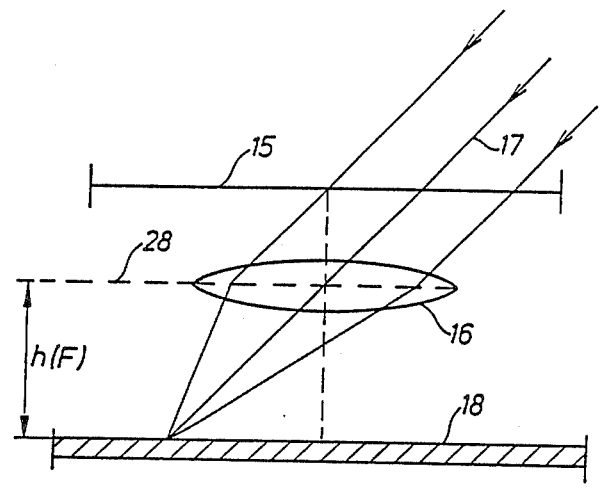
FIG. 2 is a schematic detail view of the light receiver of FIG. 1.

Typical values are for h(R) ca 50 cm and for h(S) 0–50 cm. Suppose an average value of 25 cm for h(S). With the typical values given h(N) equals to 240−50−25=165 cm. In FIG. 2 h(F) is defined as the distance in the receiver from the plane 28 of the lens to the CCD-plate 18. Also, this distance is equal to the focal length of the lens or the focal distance. An approximation is made by the presumption that incident light beams from the IR-diode 10 are parallel.

A further definition is that the horizontal distance between the center of the lens 16 and the IR-light emitting diode 10 is R while the corresponding horizontal distance between the center of the lens and the light spot on the CCD-plate 18 is r.

As no refraction takes place of the beam 17 through the center of the lens the following relation is valid:

$$h(N)/R = h(F)/r \tag{2}$$

because the two marked triangles with corresponding sides are congruent. Another condition is that the CCD-plate is to be situated in the focal plane of the lens.

Under a normal movement of the robot on a plane floor h(N) has a constant value. As in addition h(F) is always constant it follows that:

$$R = k \times r \quad (3)$$

where $$k = h(N)/h(F) = \text{constant}$$

The angle v is defined in FIG. 5 like the angle u. In this connection $u+v=90$ degrees. In addition:

$$\tan v = R/h(N) \quad (4)$$

or $$v = \arctan R/h(N)$$

In a robot the geographic resolution may be chosen to be 10 cm, i.e. the map that must be available in the memory of the master microcomputer 26 has a distance of 10 cm between each geographic coordinate point in a x-y coordinate system. As indicated above, a reasonable size of the CCD-plate corresponds to a total of 4096 elements. During these circumstances a square surface of a total of 6.4×6.4 m can be reflected in this CCD-map. As seen from the zero point, i.e. the point where a vertical line of the IR-emitter touches the floor, ±3.2 m can be covered represented in the x-direction and y-direction, respectively. This gives a total angle v according to relation (4) above of $v = \arctan 3.2/1.65 = \text{ca } 63$ degrees. The total angle of aperture of the receiver equals to $2 \times v = 126$ degrees. The magnitudes r and h(F) in formula (3) above depend on the size of the CCD-plate.

At the beginning the robot must calibrate its IR-receiver 12. To this end the robot moves to a point where the center of the lens in the receiver 12 coincides with the vertical line of the IR-emitter (v=0 degrees). Then the robot moves for example one meter in any direction, the distance being measured from the distances of rotation of the wheels 36 of the robot. By measuring the number of elements the light spot has been moved from the center of the CCD-plate the constant k can easily be calculated according to formula (3) above. Then, this value of the constant k can be used in all continued calculations of the coordinates which determine the actual position of the robot.

Figure 6:
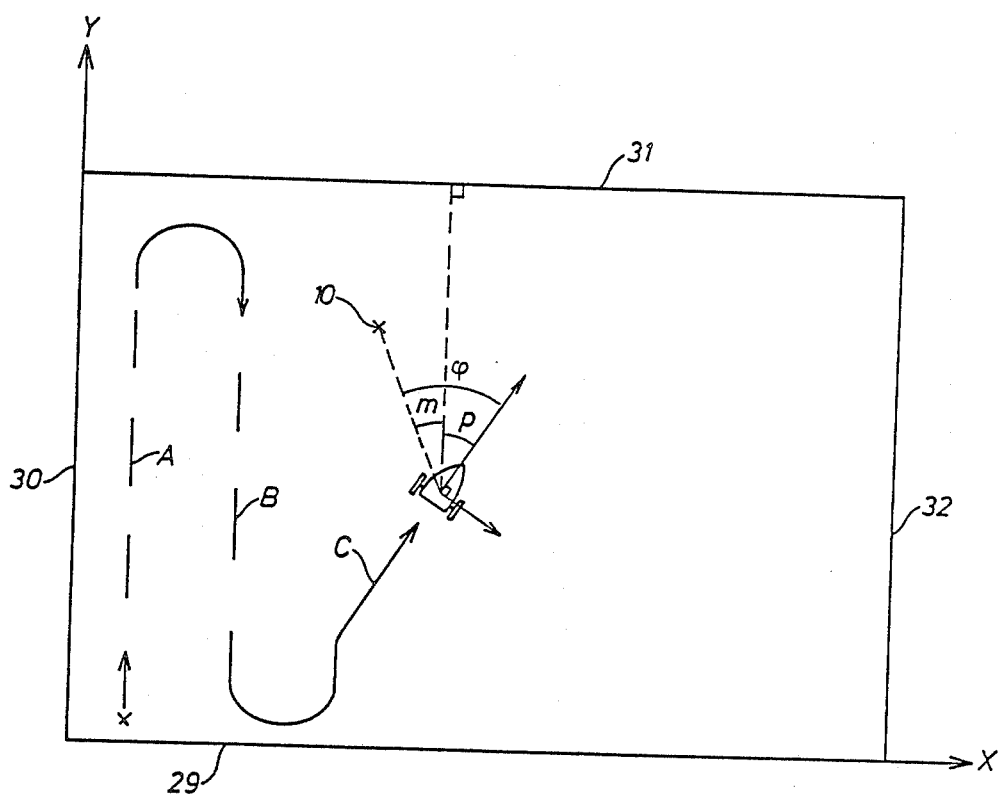
FIG. 6 shows the area of movement of the robot inserted in a coordinate system and illustrates how turning angle faults of the robot are to be corrected.

The position determining principle described above is based on the fact that the robot knows its own direction of movement with respect to the walls 29, 30, 31, 32 of the room in which the robot moves, FIG. 6. A normal traversal for a robot, for example being a self-propelled vacuum cleaner, is that it performs backward and forward movements B and A, respectively, parallel to one of the walls of the room, for example, the wall 30. If then, due to skidding at any of the wheels, the robot turns into a direction of movement as that indicated at C, for example, a corresponding fault will appear in the CCD-map of the IR-receiver 12 (fault angle p). In this case the right angle (p=0) can be recreated by conversion of the orthogonal coordinates of the position of the robot into polar coordinates (R, $\phi$) in the CCD-map. This can easily be carried out in the microcomputer 24. If (x,y) are the coordinates in the CCD-map for light-maximum from the IR-diode, then according to the definition of polar coordinates it follows that:

$$R = \sqrt{x^2 + y^2}$$

$$\phi = \arctan \frac{y}{x}$$

According to FIG. 6 $\phi = p + m$, where the fault angle is p and the correct angle to the IR-emitter is m. The desired correction of direction is achieved by ordering via the microcomputer 26 a turning of the robot to the angle p. In order for the above turning correction to be carried out it is important that unintentional turning of the robot be recognized as soon as possible. Therefore, during the movements A and B the microcomputer 24 can perform a comparison between consecutive calculated values of the angle coordinate $\phi$ and upon the occurrence of a deviation the microcomputer 24 can operate the microcomputer 26 to order a correction in the way described.

In a room having various IR-radiators, for example electric heating elements, lamps and the like, in order to avoid interference the use of modulated radiation is possible. In FIG. 3 there is shown schematically an IR-light emitting diode 33 being supplied from a battery 34 via a modulator 35. The modulator can be of any known design and the receiver can be designed so as to respond only to modulated radiation, preferably of the pulse modulated type.

The system described can be extended to include several IR radiation sources disposed at different positions in the room. Then, this sources may operate with radiation modulated in different ways. However, the advantage of greater positional accuracy is counteracted by a more complex signal processing.

Finally, there is another variant of the basic measuring principle, i.e. the use of light already present in the room as a light emitter. This means that several light sources may exist. The information processing will be more complex because in this case a simpler form of image processing is involved, referred to as pattern recognition. An initially stored light image is to be brought together with the instantaneous light image by translational and turning movements. Then, the calculated values of the translational and the turning movements correspond to the movement and the turning of the robot.

An example of the image processing will now be described with reference to FIG. 7. Three light sources are designated L1, L2 and L3. The position of the robot at the time $t_1$ is designated A and its position at the time $t_2$ is designated B. In order to illustrate the principle the light sensitive matrix has been drawn in the same scale as the robot. By this, the image creation will appear in a better way. The center of the lens system straight above the matrix is designated C. Light beams have been drawn which emanate from the three light sources L1–L3 and which pass the center C of the lens before reaching the matrix, see FIG. 2, from which it appears that light beams through the center of the lens will not be refracted.

The triangle formed by the three light sources will now be reproduced in reversed form on the matrix. In the position A of the robot this reversed reproduction is constituted by the triangle A1, A2, A3 and in the position B by the triangle B1, B2, B3.

In a more concrete form the image processing can take place in the following way. In every position wherein a position determination is to take place the first thing is to collect certain key data. In the case A the key data are the x- and y-coordinates, respectively, for the points A1, A2, and A3. It is supposed that the position A is the reference position. These key data are stored by the microprocessor. In the position B the x- and y-coordinates for the points B1, B2 and B3 are stored in the same way. One way of bringing together the two images is to compare the two groups of coordinates. Then one will find that the movement of the points of the position B to the position A (B1-A1, B2-A2, B3-A3) is proportional to the movement of the robot. In this case only a translational movement has been performed in order to illustrate the principle. If during the movement form the position A to the position B the robot has also been turned, the said turning can be determined in a similar way.

I claim:

1. An electro-optic position system for a mobile robot moving in a plane comprising at least one light source mounted in a fixed position and emitting light, a light receiver on said robot having a lens arrangement, means in said system for calculating the position of said robot relative to said light source, said light source so mounted and arranged whereby the radiation field of the light source covers the complete area within which said robot is capable of movement, said light receiver being provided with a matrix of radiation sensitive elements, said lens arrangement focusing incident light from said light source to a light spot on said matrix whereby said elements thus illuminated responding by emitting corresponding electric signals, means being provided for sensing the matrix to determine the position of said light spot from the element which unambiguously reacts to incident light, and calculating means for calculating the position coordinates of the robot in the plane of movement from the position of said unambiguously reacting element in said matrix, said calculating means being arranged to present the position coordinates in a polar form, and means being provided which during movement of the robot in a predetermined direction repeatedly compares each value of the polar angle coordinates with the immediately preceding value in order to detect and correct a turning of the robot relative to a predetermined direction.

2. A system as claimed in claim 1 wherein said plane of movement of said robot is within a room, said matrix with light sensitive elements being arranged to receive radiations from several light sources in said room, said system having storing means for storing the image on the matrix created by the light sources when the robot is in a reference position, and means which during the movement of the robot in its plane of movement is arranged to compare each instantaneous image of the light sources on the matrix with the image initially stored, and from the comparison determines the instantaneous position of said robot.

3. A system as claimed in claim 2 further comprising means for comparing the instantaneous image of the light sources with the image initially stored and displacing and turning said instantaneous image into agreement with the image initially stored, and means being arranged to determine the instantaneous position of the robot from the required distance of displacement and turning angle, respectively.

4. A system as claimed in claim 2 wherein said light sources are room lighting fixtures.

* * * * *